United States Patent
Falk

[15] 3,680,921
[45] Aug. 1, 1972

[54] CONTROL VALVE
[72] Inventor: Edward J. Falk, St. Louis, Mo.
[73] Assignee: Wagner Electric Corporation, Newark, N.J.
[22] Filed: Sept. 15, 1970
[21] Appl. No.: 72,342

Related U.S. Application Data

[62] Division of Ser. No. 841,045, July 11, 1969, Pat. No. 3,586,384.

[52] U.S. Cl..................303/6 C, 188/349, 303/84 A
[51] Int. Cl..........B60t 8/26, B60t 11/34, B60t 17/18
[58] Field of Search........303/6 C, 84, 84 A; 188/349

[56] References Cited

UNITED STATES PATENTS

| | | | |
|---|---|---|---|
| 3,464,741 | 9/1969 | Falk | 303/6 C |
| 3,480,333 | 11/1969 | Stelzer | 303/6 C |
| 3,498,681 | 3/1970 | Bueler | 303/84 A X |
| 3,508,793 | 4/1970 | Bueler | 303/6 C |
| 3,508,792 | 4/1970 | Bueler | 303/6 C |

*Primary Examiner*—Evon C. Blunk
*Assistant Examiner*—Bruce H. Stoner, Jr.
*Attorney*—Joseph E. Papin

[57] ABSTRACT

A driver warning type control valve is provided with a passage connected in by-pass relation with a proportioning valve, and a switch actuating piston for controlling said passage is movable between a normally centered position and opposed translated positions in response to separate fluid pressures supplied thereto and the proportionally reduced fluid pressure from the proportioning valve assisting one of the supplied fluid pressures. A centering piston is subjected to the other of the supplied fluid pressures and engageable with said switch actuating piston to normally urge said switch actuating piston toward its centered position and oppose movement thereof toward one of its opposed translated positions for opening the by-pass passage.

14 Claims, 4 Drawing Figures

INVENTOR
EDWARD J. FALK

INVENTOR
EDWARD J. FALK

CONTROL VALVE

This application is a division of copending application Ser. No. 841,045 filed July 11, 1969 which issued into U.S. Pat. No. 3,586,384 on June 22, 1971.

This invention relates in general to dual fluid pressure systems and in particular to driver warning valves utilized therein.

In the past, driver warning valves were utilized in dual brake systems to energize a driver warning lamp in the event of failure of one of the dual brake systems, and such driver warning valves have also been combined with either a proportioning valve for proportioning the fluid pressure delivered to the rear brakes or a metering valve for metering the fluid pressure delivered to the front brakes; however, one of the disadvantageous features of such past combination type driver warning valves was that at least one of the proportioning and metering valves was a separate entity or unit from the combination type warning valves. Of course, such separation not only affected the cost of manufacturing the valves per se but also the cost of assembly on the vehicle, and the utilization of such separate units also poses a space factor problem in assembly on the vehicle since the under-the-hood space in modern vehicles is becoming quite critical. Another disadvantageous or undesirable feature of such past separate valve units was that the inherent characteristics, such as structural arrangements and/or operational features indigenous to each, were not effectively combined or inter-related. Still another disadvantageous or undesirable feature of such past warning valves which utilized a by-pass for the proportioning valve was that the effective areas on the translatory actuating piston for the driver warning switch could not be subjected to the altered or proportioned output fluid pressure of the proportioning valve.

The primary object of the present invention is to provide a control valve which overcomes the aforementioned undesirable or disadvantageous features; and this, as well as other objects and advantageous features of the present invention, will become apparent hereinafter.

Briefly, the invention comprises a control valve having a housing with passage means therein for connection in by-pass relation with a proportioning valve, means for controlling said passage means and movable between a centered position and opposed translated positions in response to separate fluid pressures supplied thereto and the proportionally reduced fluid pressure from said proportioning valve in assisting relation with one of the supplied fluid pressures, and centering means responsive to the other supplied fluid pressure for urging said first named means toward its centered position and against movement toward one of its opposed translated positions for opening said passage means.

In the drawings, wherein like numerals refer to like parts wherever they occur:

Figure 1:
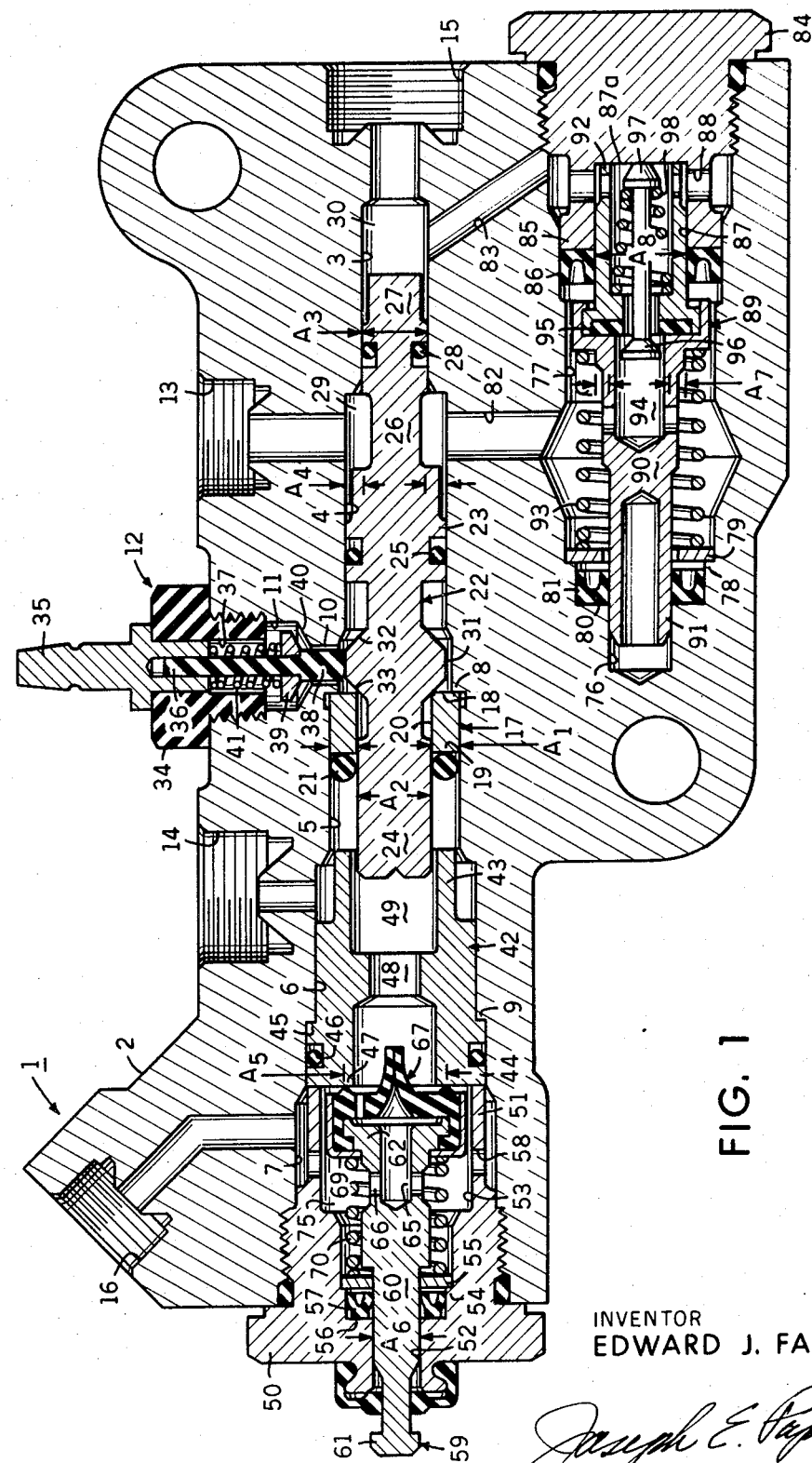
FIG. 1 is a sectional view illustrating a control valve embodying the present invention in cross-section.
Figure 2:
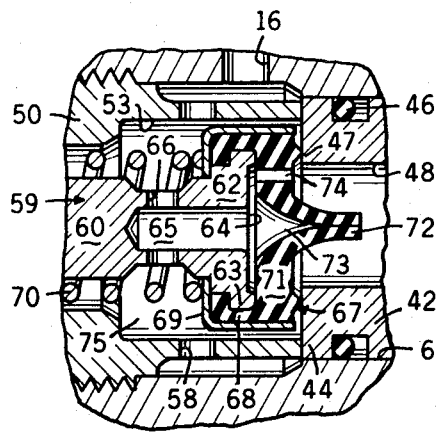
FIG. 2 is an enlarged fragmentary view taken from FIG. 1.

Referring now to the drawing in detail, a control valve 1 is provided with a housing 2 having a bore 3 therein aligned with stepped counterbores 4, 5, 6 and 7, and shoulders 8, 9 are provided on said housing between said counterbores 4, 5 and 6, 7, respectively. A cross-bore and cross-counterbore 10, 11 are also provided in the housing 2, said cross-bore intersecting with the counterbore 4 and said cross-counterbore being threaded at its open end to threadedly receive an electrical switch, indicated generally at 12 (to be discussed in detail hereinafter). Inlet ports 13, 14, which are adapted for connection with separate fluid pressure generating chambers of a tandem or split system master cylinder (not shown), are provided in the housing 2 intersecting with the counterbores 4, 6, respectively, and an outlet port 15, which is adapted for connection with rear drum brakes of conventional types, is also provided in said housing intersecting with the bore 3.

A centering piston, indicated generally at 17, is slidably received in the counterbore 5 having opposed ends or abutment surfaces 18, 19, and an axially extending bore 20 is provided through said centering piston between said opposed ends thereof. An O-ring seal 21 is sealably engaged between the counterbore 5 and the leftward end 19 of the centering piston 17, and the rightward opposed end 18 thereof is normally engaged with the housing shoulder 8, said O-ring and leftward end of said centering piston defining an annular effective area $A_1$ subjected to the fluid pressure at the inlet port 14 at all times.

A comparator or reciprocal switch actuating member or piston, indicated generally at 22, is shown in its centered or normal operating position in the housing 2 having spaced opposed annular flanges or end portions 23, 24 thereon. The switch piston flange 24 is slidably received in the centering piston bore 20 and extends through the O-ring 21 in sealing engagement therewith into the housing counterbore 5, and the sealing engagement of said flange and O-ring defines an effective area $A_2$ on said flange subjected to the fluid pressure at the inlet port 14 at all times. The switch piston flange 23 is slidably received in the housing counterbore 4 between the cross-bore 10 and inlet port 13, and a peripheral seal 25 is carried in said flange in sealing engagement with said housing counterbore. An extension 26 is integrally connected with the piston flange 23 having a rightward or free end portion 27 slidably received in the housing bore 3, and a peripheral seal or valve element 28 is carried in said free end portion in sealing engagement with said housing bore and normally interrupting pressure fluid communication between the inlet and outlet ports 13, 15. An inlet chamber 29 is defined in the housing counterbore 4 between the piston flange 23 and the extension end portion 27, and an outlet chamber 30 is defined in the housing bore 3 between said extension end portion and the outlet port 15, said housing bore 3 defining a by-pass passage between the inlet and outlet ports 13, 15. The sealing engagement of the seal 28 with the housing bore 3 defines an effective area $A_3$ on the extension free end 27 which is subjected to the fluid pressure at the outlet port 15 when the switch piston 22 is in its centered position, and another annular effective area $A_4$ is provided on the piston flange 23 being subjected to the fluid pressure at the inlet port 13 at all times, said area $A_4$ being substantially defined by the difference between the cross-sectional sealing areas of the seals 25, 28. It should be noted that areas $A_1$ and $A_2$ are additive and opposed to areas $A_3$, $A_4$ which are also additive, and areas $A_2$, $A_4$ are substantially equal while area $A_1$ is greater than area $A_3$. The switch piston 22 is also provided with a switch positioning portion or land 31 which is positioned beneath the housing cross-bore 10 when said switch piston is in its centered position (as shown), and peripheral cam faces 32, 33 are also provided on said switch piston on opposite sides of said land, said cam face 33 also providing an abutment for engagement with the rightward end 18 of the centering piston 17.

The switch 12, as previously mentioned, includes a non-conductive closure or plug member 34 threadedly and non-conductively received in the housing cross-counterbore 11, and a metal terminal 35 extends through said plug member being insulated therefrom, said terminal having an exterior end for connection in an electrical circuit of a type well known to the art for selectively energizing a driver warning or dash lamp (not shown). A non-conductive switch member 36 is slidably received in a bore 37 provided in the terminal 35, said switch member having a lower end or follower portion 38 extending through the housing cross-bore 10 for engagement with the piston land 31 and having a conductive contact 39 on the upper portion thereof for electrical engagement with another contact 40 on the housing 2. A current carrying spring 41 is interposed between the interior end of the terminal 35 and the switch member contact 39 urging the follower portion 38 of the switch member 36 into positioning engagement with the switch piston land 31.

A spacer member 42 having opposed ends 43, 44 with an annular shoulder 45 therebetween is received in the housing counterbores 6, 7 with said shoulder engaged with the housing shoulder 9, and a peripheral seal 46 is carried on said spacer member in sealing engagement with the housing counterbore 7. The rightward end 43 of the spacer 42 extends coaxially into the housing counterbore 5 defining an abutment to prevent the displacement of the seal 21 therefrom. Another inlet chamber 49 is defined in the housing counterbores 5, 6 between the spacer 42 and the seal 21 and switch piston flange 24, said inlet chamber being connected in open pressure fluid communication with the inlet port 14 and the spacer passage 48 at all times.

A closure member or end plug 50 is threadedly received in the leftward end of the housing counterbore 7 and has a reduced extension 51 connected in abutting displacement preventing engagement with the spacer leftward end 44. The description and operation of the metering valve indicated generally at 59 and its cooperating components in the control valve 1 is set forth in the aforementioned U.S. Pat. No. 3,586,384 and for the sake of brevity is therefore omitted herefrom.

A blind bore 76 is also provided in the housing 2 and aligned with a stepped counterbore 77 having a shoulder 78 therein in seating engagement with an annular spring retainer 79, and another shoulder 80 is provided in said housing between said blind bore and stepped counterbore and in seating engagement with an annular seal 81. A connecting passage 82 is provided in the housing 2 having one end connected with the inlet chamber 29 and the other end thereof intersecting with the housing counterbore 77 adjacent to the mid-portion thereof, and another connecting passage 82 is also provided in said housing having one end connected with the outlet chamber 30 and the other end thereof intersecting with said housing counterbore adjacent to its rightward end. Another closure member 84 is threadedly received in the rightward end of the housing counterbore 77 having an extension 85 extending into said housing counterbore and defining a seat for another annular seal 86 sealably engaged with said extension and said housing counterbore between the connecting passages 82, 83. A blind bore 87 having an end wall 87a is provided in the closure member extension 85 substantially coaxial with the housing counterbore 77, and a plurality of cross-passages 88 are also provided through said closure member extension connecting said blind bore with the connecting passage 83.

A proportioning valve, indicated generally at 89, is provided with a piston or body portion 90 having opposed end portions 91, 92. The proportioning piston end 91 extends through the seal 81 in sealing engagement therewith and is slidably received in the housing blind bore 76, and the proportioning piston end 92 extends through the seal 86 in sealing engagement therewith and is slidably received in the closure member blind bore 87. A metering or proportioning spring 93 is biased between the retainer 79 and the proportioning piston end 92 toward abutting engagement with the closure member wall 87a. A passage 94 is provided in the proportioning piston 90 having one end connected in pressure fluid communication with the connecting passage 82 through the housing counterbore 77 and the other end connected in pressure fluid communication with the connecting passage 83 through the closure member blind bore 87, the cross-passages 88 and said housing counterbore, and a valve seat 95 is provided on said proportioning piston about the passage 94. A valve 96 is movable in the proportioning piston passage 94 and normally disengaged from the valve seat 94, and a stem 97 is integrally formed with said valve extending through said valve seat and normally urged into abutting engagement with the closure member wall 87a by a valve spring 98 biased between the proportioning piston 90 and said stem. To complete the description of the control valve 1, it should be noted that the proportioning piston 90 is provided with an effective input area $A_7$ which is substantially equal to the difference between the cross-sectional areas of the sealing engagement of the proportioning piston end portions 91, 92 with the seals 81, 86, respectively, and the sealing engagement of said proportioning piston end portion 92 with the seal 86 defines an effective output area $A_8$ on said proportioning piston and opposed to the area $A_7$, said areas $A_7$, $A_8$ being respectively subjected to the fluid pressure at the inlet and outlet ports 13, 15.

In the operation with the component parts of the control valve 1 in their normal operating positions as shown in the drawings and as described hereinbefore, assume that substantially equal and separate input or supplied fluid pressures $P_1$, $P_2$ are transmitted from the separate fluid pressure generating chambers of the split master cylinder (not shown) to the inlet ports 13, 14 of said control valve. The supplied fluid pressures $P_1$, $P_2$ flow from the inlet ports 13, 14 into the inlet chambers 29, 49, respectively, acting on the switch piston areas $A_2$, $A_4$ to establish substantially equal and opposite forces $P_1 A_4$ and $P_2 A_2$, and the supplied fluid pressure $P_2$ also acts on the effective area $A_1$ of the seal 21 to establish another force $P_2 A_1$ urging the centering piston 17 toward abutting engagement with the housing shoulder 8 and the switch piston 22. The supplied fluid pressure $P_1$ is applied from the inlet chamber 29 through the connecting passage 82, the housing counterbore 77, the proportioning piston passage 93 and the bore 87 and cross-passages 88 of the closure member 84 into the connecting passage 83 and therefrom through the housing bore 3 and the outlet port 30 to the outlet port 15 to establish an output or applied fluid pressure $P_{10}$, said outlet port being connected with the rear brakes (not shown). Since the supplied and applied fluid pressures $P_1$, $P_{10}$ are substantially equal through the range OR, as shown on the line ORS in the graph of FIG. 3, the applied fluid pressure $P_{10}$ in the outlet chamber 30 acts on the effective area $A_3$ of the switch piston 22 to establish a force $P_{10} A_3$ which is additive to the force $P_1 A_4$; however, since the centering piston area $A_1$ is greater than the switch piston area $A_3$ and the fluid pressures $P_1$, $P_2$ are substantially equal, the force $P_2 A_1$ is greater than the force $P_{10} A_3$ so that the switch piston 22 will remain in it centered position against translatory leftward movement. Since the areas $A_2$, $A_4$ are substantially equal, it is apparent that the additive forces $P_{10} A_3$ and $P_1 A_4$ are greater than the opposing force $P_2 A_2$ to obviate rightward translatory movement of the switch piston 22 from its centered position.

The supplied fluid pressure $P_1$ acts on the input effective area $A_7$ of the metering piston 90 to establish an input force $P_1 A_7$, and the output fluid pressure $P_{10}$ acts on the output effective area $A_8$ of said metering piston to establish an output force $P_{10} A_8$ in opposition to the input force $P_1 A_7$. Since the supplied and applied fluid pressures $P_1$ and $P_{10}$ are initially equal, as previously mentioned, and since the area $A_8$ is greater than the area $A_7$ of the metering piston 90, it is obvious that the output force $P_{10} A_8$ is greater than the input force $P_1 A_7$; however, the compressive force Fc of the proportioning spring 93 prevents movement of the metering piston 90 until the supplied and applied fluid pressures $P_1$, $P_{10}$ exceed the predetermined value R, as shown by the line OR in the graphical representation of FIG. 3. When the predetermined value R of the supplied and applied fluid pressures $P_1$, $P_{10}$ is attained, the output force $P_{10} A_8$ overcomes the additive input and spring forces $P_1 A_7$, Fc to move the metering piston 90 from its original or disabled position in a leftward direction toward an operative or metering position to store an energy of the spring 93. This leftward movement of the metering piston 90 engages the valve seat 95 thereof with the valve member 96 to isolate the supplied fluid pressure $P_1$ from the applied fluid pressure $P_{10}$.

Figure 3:
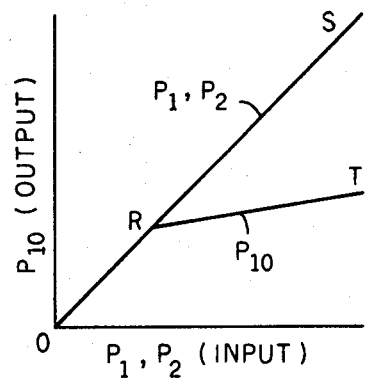
FIG. 3 is a graphical representation of the applied fluid pressure effected by the proportioning valve of FIG. 1 in response to the input fluid pressure supplied thereto.
Figure 4:
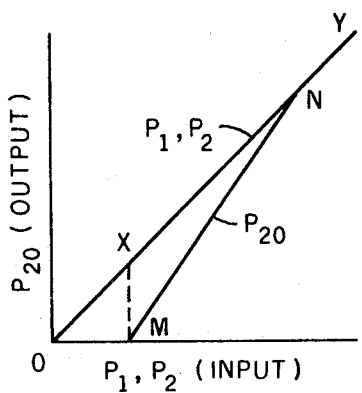
FIG. 4 is a graphical representation of the applied fluid pressure effected by the metering valve of FIG. 1 in response to the input fluid pressure supplied thereto.

From the graphical representation in FIG. 3, it is obvious that increases in the magnitude of the supplied fluid pressure $P_1$ in excess of the predetermined value R, as shown by the line RS, will result in proportionally reduced increases in the output fluid pressure $P_{10}$, as shown by the line RT. For instance, when the input fluid pressure is increased to a value in excess of the predetermined value R, the input force $P_1 A_7$ is correspondingly increased and additive to the spring force Fc to overcome the output force $P_{10} A_8$; therefore, the metering piston 90 is moved rightwardly toward a metering position disengaging the valve seat 95 from the valve member 96 to effect a metered application of the increased supplied fluid pressure $P_1$ through the metering piston passage 94, the closure member bore 87 and cross-passages 88, the housing passage 83 and the outlet chamber 30 to the outlet port 15 to effect a proportional or ratioed increase in the applied fluid pressure $P_{10}$, as shown by the line RT in the graph of FIG. 3 wherein $P_{10} = (P_1 A_7 + Fc)/A_8$. Of course, the increased applied fluid pressure $P_{10}$ effects a corresponding increase in the output force $P_{10} A_8$, and when the increased output force $P_{10} A_8$ attains an increased value substantially equal to that of the increased input force $P_1 A_7$ and the additive spring force Fc, the metering piston 90 is again moved leftwardly toward its isolating position re-engaging the valve seat 95 thereof with the valve member 96 to again isolate the increased supplied and applied fluid pressures $P_1$, $P_{10}$. It is, of course, obvious that the metering piston 90 will be responsive to further increases in the supplied fluid pressure $P_1$ to effect further corresponding proportional increases in the applied fluid pressure $P_{10}$ in the same manner as previously described. It should also be noted that as the supplied fluid pressure $P_1$ is increased, the separate supplied fluid pressure $P_2$ is also substantially equally increased to maintain the balance between the opposing forces $P_1 A_4$ and $P_2 A_2$ acting across the switch piston 22 and to increase the force $P_2 A_1$ acting on the centering piston to compensate for the increased force $P_{10} A_3$ acting on said switch piston.

When the split master cylinder is de-actuated, the supplied fluid pressures $P_1$, $P_2$ are vented to atmosphere which eliminates the forces $P_1 A_4$, $P_2 A_1$ and $P_2 A_2$ acting on the centering and switch pistons 17, 22, as well as the input force $P_1 A_7$ acting on the metering piston 90, and the output fluid pressure $P_{10}$ acting on the effective area of the valve member 96 moves said valve member against its spring 98 toward an open position disengaged from the valve seat 95. In this manner, the applied fluid pressure $P_{10}$ is eliminated or vented from the outlet port 15 through the outlet chamber 30, the housing passage 83, the closure member cross-passage 82 and therefrom through the inlet chamber 29 to the inlet port 13. Upon the elimination of the output fluid pressure $P_{10}$, the force $P_{10} A_3$ acting on the switch piston is eliminated, and, of course, the output force $P_{10} A_8$ is also eliminated; therefore, the compressive force Fc of the metering spring 93 will return the metering piston 90 to its original position.

In the event that the supplied fluid pressure $P_2$ fails due to leaks or the like, it is apparent that the forces $P_2 A_1$, $P_2 A_2$ are eliminated and the forces $P_1 A_4$, $P_{10} A_3$ acting on the switch piston 22 are effective to urge said switch piston leftwardly toward its leftward translated position. The leftward translatory movement of the switch piston 22 concertedly drives the centering piston 17 and seal 21 therewith until the switch piston flange 24 engages the spacer member 42 which defines the leftward translatory position of said switch piston. The leftward translatory movement of the switch piston 22 in response to the sustained forces $P_1 A_4$, $P_{10} A_3$ also moves at least a portion of the switch piston extension free end 27 from the housing bore 3 into the housing counterbore 4, and the seal 28 is moved leftwardly therewith toward a position in the housing counterbore 4 and disengaged from the housing bore 3 to open said housing bore in by-pass relation between the inlet and outlet chambers 29, 30 and established pressure fluid flow from the inlet port 13 through said inlet chamber, said housing bore and said outlet chamber to the outlet port 15 in by-pass relation to the proportioning valve 89 to effect energization of the rear brakes. Therefore, upon the failure of the supplied fluid pressure $P_2$, it is obvious that the supplied fluid pressure $P_1$ is transmitted directly from the inlet port 13 to the outlet port 15 to effect full energization of the rear brakes, and also that the proportioning valve 89 is by-passed or shunted to obviate the proportioning or altering effect thereof on the magnitude of the applied fluid pressure $P_{10}$ normally delivered to the outlet port 15.

The leftward translatory movement of the switch piston 22 upon the failure of the supplied fluid pressure $P_2$, as above described, moves the piston land 31 leftwardly toward a position disengaged from the lower end of the switch member follower portion 38, and the compressive force of the switch spring 41 moves the switch operating member 36 downwardly to engage the contact 39 thereof with the plug member contact 40. In this manner, the engagement of the switch operating member contact 39 with the plug member contact 40 energizes a driver warning lamp (not shown). When the malfunction has been corrected in order to re-establish the supplied fluid pressure $P_2$, the re-established supplied fluid pressure $P_2$ again acts on the effective areas $A_1$, $A_2$ of the centering and switch pistons 17, 22 to re-establish the forces $P_2 A_1$, $P_2 A_2$ which are effective to return said centering and switch pistons toward their normal positions against the opposing additive forces $P_1 A_4$, $P_1 A_3$ acting on said switch piston. Upon the return movement of the centering and switch pistons 17, 22 toward their normal positions in response to the re-establishment of the supplied fluid pressure $P_2$, the cam surface 32 of the switch piston is engaged with the lower end of the switch member follower portion 38 and cams or drives the switch member 36 upwardly to disengage the switch member contact 39 from the plug member contact 40 thereby de-energizing the driver warning dash lamp (not shown), and with said switch piston returned to its normal or centered position, the land 31 thereof is again in positioning engagement with the switch member follower portion 38.

In the event that the supplied fluid pressure $P_1$ fails due to leaks or the like, it is apparent that the forces $P_1 A_4$, $P_{10} A_3$ acting on the switch piston 22 are eliminated along with the forces $P_1 A_7$ and $P_{10} A_8$ which, of course, renders the proportioning valve 89 inoperative. Upon the elimination of the forces $P_1 A_4$, $P_{10} A_3$, the force $P_2 A_2$ is effective to urge said switch piston rightwardly toward its rightward translated position independently of the centering piston 17 which is urged into abutting engagement with the housing shoulder 8 in response to the force $P_2 A_1$. The rightward translatory movement of the switch piston 22 engages the switch piston extension free end 27 with the housing 2 rightwardly thereof and adjacent to the outlet port 15 which defines the rightward translated position of said switch piston. The rightward translatory movement of the switch piston 22 upon the failure of the supplied fluid pressure $P_1$, as above described, moves the piston land 31 rightwardly toward a position disengaged from the lower end of the switch member follower portion 38, and the compressive force of the switch spring moves the switch operating member 36 downwardly to engage the contact 39 thereof with the plug member contact 40. In this manner, the engagement of the switch operating member contact 39 with the plug member contact 40 energizes the driver warning lamp. When the malfunction has been corrected in order to re-establish the supplied fluid pressure $P_1$, the re-established supplied fluid pressure $P_1$ also re-establishes the additive forces $P_1 A_4$ and $P_{10} A_3$ which are effective to return the switch piston 22 toward its normal centered position against the lesser force $P_2 A_2$; however, upon the engagement of the switch piston surface 33 with the centering piston 17 the force $P_2 A_1$ is then additive to the force $P_2 A_2$ and greater than the opposing additive forces $P_1 A_4$, $P_{10} A_3$ to prevent the return movement of said switch piston past its centered position. Upon the leftward return movement of the centering piston 22, the cam surface 33 thereof engages the switch member follower portion 38 to cam or drive the switch member 36 upwardly toward its position disengaging the contact 39 thereon from the plug member contact 40 which deenergizes the driver warning dash lamp, and with switch piston 22 in its centered position, the positioning land 31 thereof is in positioning engagement with the lower end of the switch member follower portion 38.

From the foregoing, it is now apparent that a novel control valve 1 meeting the objects and advantageous features set forth hereinbefore, as well as others, is provided and that changes as to the precise configuration, shapes and details of the construction set forth in the disclosure by way of illustration may be made by those skilled in the art without departing from the spirit of the invention.

The embodiments of the invention in which an exclusive property or privilege is claimed are defined as follows:

1. A control valve comprising a housing, metering means movable in said housing to effect the application through said housing of fluid pressure supplied thereto, said metering means being initially movable in response to supplied and applied fluid pressure of a predetermined value toward a position in said housing isolating the supplied and applied fluid pressures and being thereafter further movable in response to increases in the supplied fluid pressure toward a metering position to effect a reduced metered increase in the applied fluid pressure in a predetermined ratio with the increased supplied fluid pressure in excess of the predetermined value, passage means in said housing connected in by-pass relation between the supplied and reduced applied fluid pressures around said metering means, other means for controlling pressure fluid communication through said passage means between the supplied and reduced applied fluid pressures and movable in said housing from a normally centered position toward opposed translated positions, a pair of additive areas on said other means for respective subjection to the supplied and reduced applied fluid pressures, an opposing area on said other means opposed to said additive areas for subjection to another separate fluid pressure supplied to said housing, said other means being urged against the other supplied fluid pressure acting on said opposing area in response to the first named supplied fluid pressure and the applied fluid pressure respectively acting on said additive areas toward one of its translated positions to establish equalizing pressure fluid communication through said passage means between the first named supplied fluid pressure and the reduced applied fluid pressure and by-pass said metering means to obviate the metering effect thereof in the event of a differential between the magnitude of the first named supplied fluid pressure greater than that of the other supplied fluid pressure exceeds another predetermined value, and only a single centering means movable in said housing for engagement with said housing and with said other means including another opposing area for subjection to the other supplied fluid pressure and additive to said first named opposing area, the other supplied fluid pressure acting on said other opposing area to urge said centering means toward engagement with said housing and said other means to oppose movement of said other means toward the one translated position when the differential between the magnitude of the first named supplied fluid pressure in excess of that of the other supplied fluid pressure is less than the other predetermined value.

2. A control valve according to claim 1, comprising a pair of opposed metering areas on said metering means for respective subjection to the first named supplied fluid pressure and the applied fluid pressure, said metering means being movable toward its isolating position in response to the first named supplied fluid pressure and the applied fluid pressure of the first named predetermined value acting on said metering areas and being thereafter further movable in response to the increases in the first named supplied fluid pressure in excess of the first named predetermined value acting on one of said metering areas toward its metering position to effect the reduced metered increase in the applied fluid pressure acting on the other of said metering areas in the predetermined ratio with the increased first named supplied fluid pressure in excess of the first named predetermined value.

3. A control valve according to claim 2, wherein said one metering area is predeterminately less than said other metering area.

4. A control valve according to claim 2, means in said housing including said metering means defining other passage means for the application of the first named supplied fluid pressure therethrough, said first named passage means being connected in by-pass relation with said other passage means across said metering means.

5. A control valve according to claim 4, wherein said metering means includes a valve seat in said other passage means, and valve means for engagement with said valve seat to control the application of said first named supplied fluid pressure through said other passage means, said metering means being movable toward its isolating position to engage said valve seat with said valve means closing said other passage means and said metering means being thereafter further movable toward its metering position to disengage said valve seat from said valve means opening said other passage means to effect the reduced metered increase of the applied fluid pressure.

6. A control valve comprising a housing having a pair of inlet chambers and an outlet chamber therein, metering means movable in said housing for controlling pressure fluid communication between one of said inlet chambers and said outlet chamber, said metering means being movable in response to established fluid pressures of a predetermined value in said one inlet chamber and said outlet chamber toward a position in said housing isolating the fluid pressure in said one inlet chamber from that in said outlet chamber and being thereafter further movable in response to increases in excess of the predetermined value of the fluid pressure in said one inlet chamber toward a metering position establishing metered pressure fluid communication between said one inlet chamber and said outlet chamber to effect a reduced metered increase of the fluid pressure in said outlet chamber in a predetermined ratio with the increased fluid pressure in said one inlet chamber in excess of the predetermined value, passage means in said housing between said one inlet chamber and said outlet chamber in by-pass relation with said metering means, other means controlling pressure fluid communication through said passage means between said one inlet chamber and said outlet chamber and movable in said housing between a normally centered position closing said passage means and opposed translated positions including a pair of additive areas for respective subjection to the fluid pressure in said one inlet chamber and the reduced metered fluid pressure in said outlet chamber, and an opposing area opposed to said additive areas for subjection to the fluid pressure in the other of said inlet chambers, said other means being urged against the fluid pressure in said other inlet chamber acting on said opposing area toward one of its translated positions opening said passage means and establishing equalizing pressure fluid communication therethrough between the fluid pressure in said one inlet chamber and the reduced metered fluid pressure in said outlet chamber to by-pass said metering means and obviate the metering effect thereof in response to the fluid pressure in said one inlet chamber and the reduced metered fluid pressure in said outlet chamber respectively acting on said additive areas when the differential between the fluid pressure in said one inlet chamber in excess of that of the fluid pressure in said other inlet chamber exceeds another predetermined value, and only a single centering means movable in said other inlet chamber for engagement with said housing and with said other means including another opposing area for subjection to the fluid pressure in said other chamber and additive to said first named opposing area, said single centering means being urged toward engagement with said housing and said other means to oppose movement of said other means toward the one translated position thereof in response to the fluid pressure in said other outlet chamber acting on said other opposing area when the differential between the magnitude of the fluid pressure in said one inlet chamber in excess of that of the fluid pressure in said other inlet chamber is less than the other predetermined value.

7. A control valve comprising a housing having three ports therein, metering means movable in said housing for controlling pressure fluid communication between two of said ports, said metering means being initially movable in response to fluid pressures at said two ports of a predetermined value toward a position in said housing isolating the fluid pressures at said two ports and being thereafter further movable in response to increases in the fluid pressure at one of said two ports toward a metering position establishing metered pressure fluid communication between the fluid pressures at said two ports to effect a reduced metered increase in the fluid pressure at the other of said two ports in a predetermined ratio with the increased fluid pressure at said one of said two ports in excess of the predetermined value, other means movable in said housing for comparing the magnitudes of the fluid pressures at one of said one and other of said two ports and said third port and for controlling by-pass pressure fluid communication between said two ports, said other means including a pair of additive areas for respective subjection to the fluid pressure and reduced metered fluid pressure at said two ports, and an opposing area for subjection to the fluid pressure at said third port and opposed to said additive areas, said other means being movable in said housing toward a position establishing equalizing by-pass pressure fluid communication between said two ports to obviate the metering effect of said metering means in response to the fluid pressure and the reduced metered fluid pressure at said two ports respectively acting on said additive areas in the event of the failure of the fluid pressure at said third port acting on said opposing area, and only a single centering means movable in said housing for engagement with said housing and with said other means including another opposing area for subjection to the fluid pressure at said third port and additive to said first named opposing areas, the fluid pressure at said third port acting on said other opposing area to normally urge said single centering means toward engagement with said housing and said other means to oppose movement of said other means toward its field pressure by passing position.

8. A control valve according to claim 7, wherein said first named opposing area is at least equal to one of said additive areas subjected to the fluid pressure at said one of said two ports, and said other opposing area is greater than one of said one additive area and the other of said additive areas.

9. A control valve according to claim 8, wherein said one additive area is greater than said other additive area subjected to the fluid pressure at said other of said two ports, and said other opposing area is greater than said other additive area.

10. A control valve according to claim 7, comprising passage means in said housing between said two ports and connected in by-pass relation around said metering means, said other means being movable in said passage means and normally closing said passage means to interrupt pressure fluid communication therethrough between said two ports, and said other means being movable to its by-pass position to open said passage means and establish the equalizing by-pass pressure fluid communication between said two ports therethrough.

11. A control valve according to claim 7, comprising passage means in said housing connected between said two ports and connected in by-pass relation with said metering means, said other means including piston means movable in said housing between said one of said two ports and said third port and having opposed portions thereon, one of said opposed portions defining one of said additive areas subjected to the fluid pressure at said one of said two ports and the other of said opposed portions defining said first named opposing area, extension means on said one opposed portion having a free end portion movable in said passage means and normally interrupting pressure fluid communication therethrough between said two ports, the other of said additive areas being defined on said extension means and subjected to the reduced metered fluid pressure at said other of said two ports, said free end portion being movable toward a position establishing open pressure fluid communication through said passage means between said two ports upon the movement of said other means to its by-passing position.

12. A control valve according to claim 11, comprising seal means on said extension means and normally engaged with said passage means to interrupt pressure fluid communication therethrough between said two ports, said seal means being disengaged from said passage means to open said passage means upon the movement of said other means to its by-passing position.

13. A control valve according to claim 11, wherein said single centering means includes other piston means movable in said housing, the other of said opposed portions extending coaxially through said other piston means, opposed ends on said other piston means, one of said opposed ends defining said other additive area, abutment means in said housing for engagement with the other of said opposed ends, and other abutment means on said first named piston means for engagement with said other opposed end, said other opposed end being urged toward engagement with said first named and other abutment means in response to the fluid pressure at said third port acting on said other opposing area.

14. A control valve comprising a housing, a proportioning valve movable in said housing for performing proportioning operations on fluid pressure supplied thereto, said proportioning valve being operable generally to effect the application through said housing of a reduced fluid pressure in a predetermined ratio with the supplied fluid pressure under preselected conditions, comparator means defining with said housing passage means in by-pass relation with said proportioning valve and movable in said housing between a normal position and opposed translated positions for controlling said passage means, a pair of additive areas on said comparator means for respective subjection to the supplied and reduced applied fluid pressures, an opposing area on said comparator means opposed to said additive areas for subjection to another fluid pressure supplied to said housing, said comparator means being movable from its normal position toward one of its opposed translated positions in response to the first named supplied fluid pressure and the applied fluid pressure respectively acting on said additive areas in the event of the failure of the other supplied fluid pressure acting on said opposing area to open said passage means and by-pass said proportioning valve obviating proportioning operation thereof, and only a single centering means movable in said housing for engagement with said housing and comparator means and subjected only to the other supplied fluid pressure, said single centering means being urged in response to the other supplied fluid pressure acting thereon toward engagement with said housing and comparator means to oppose movement thereof toward its one translated position when the differential between the magnitudes of the first named and other supplied fluid pressures respectively acting on one of said additive areas and said opposing area is less than a predetermined value.

* * * * *